US010013641B2

(12) United States Patent
Helfman et al.

(10) Patent No.: US 10,013,641 B2
(45) Date of Patent: Jul. 3, 2018

(54) INTERACTIVE DENDROGRAM CONTROLS

(75) Inventors: Jonathan Helfman, Half Moon Bay, CA (US); Joseph H. Goldberg, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

(21) Appl. No.: 12/831,623

(22) Filed: Jul. 7, 2010

(65) Prior Publication Data

US 2011/0074789 A1 Mar. 31, 2011

Related U.S. Application Data

(60) Provisional application No. 61/246,385, filed on Sep. 28, 2009, provisional application No. 61/247,313, filed on Sep. 30, 2009.

(51) Int. Cl.
*G06K 9/62* (2006.01)
*G06T 11/20* (2006.01)

(52) U.S. Cl.
CPC .......... *G06K 9/6254* (2013.01); *G06K 9/6219* (2013.01); *G06T 11/206* (2013.01)

(58) Field of Classification Search
CPC .............. G06F 3/0481; G06F 3/04812; G06F 3/04847; G06F 3/0485; G06F 3/04855; G06F 9/4443; G06F 17/211; G06F 17/2247; G06F 17/245; G06F 17/246; G06T 11/00; G06T 11/20; G06T 11/203; G06T 11/206; G06T 11/60; H04L 41/22

USPC ........ 345/441, 440, 619, 672, 676; 715/227, 715/833
See application file for complete search history.

(56) References Cited

U.S. PATENT DOCUMENTS 5,442,778 A * 8/1995 Pedersen et al.
5,986,673 A * 11/1999 Martz ............................ 345/649
6,023,659 A * 2/2000 Seilhamer ............... G06F 19/28
702/19

(Continued)

OTHER PUBLICATIONS

Jinwook Seo; Shneiderman, B., "Interactively exploring hierarchical clustering results [gene identification]," Computer, vol. 35, No. 7, pp. 80-86, Jul. 2002, doi: 10.1109/MC.2002.1016905.*

(Continued)

*Primary Examiner* — Sae Won Yoon
(74) *Attorney, Agent, or Firm* — Kilpatrick Townsend & Stockton LLP

(57) ABSTRACT

Embodiments of the invention provide systems and methods for analyzing and presenting, e.g., displaying, a set of data. Analyzing the data can include grouping or clustering data that are similar in some way, e.g., similar ranges of quantities, similar categories, etc. and providing an interactive dendrogram representing the clustered data. More specifically, a method for providing an interactive representation of data of a data set can comprise clustering the data into a hierarchical set of clustered data. A dendrogram can be generated based on the clustered data and representing a hierarchy of the clustered data and displayed on a page of a user interface. A selection of a depth of the dendrogram can be received via the user interface and the page can be updated based on the selection of the depth of the dendrogram.

24 Claims, 11 Drawing Sheets

(56) References Cited

U.S. PATENT DOCUMENTS

| | | | |
|---|---|---|---|
| 6,380,937 B1* | 4/2002 | Dong et al. | 345/440 |
| 6,446,061 B1* | 9/2002 | Doerre et al. | 707/738 |
| 7,031,847 B1* | 4/2006 | Nozaki et al. | 702/20 |
| 7,062,502 B1 | 6/2006 | Kesler | |
| 7,127,354 B1* | 10/2006 | Nozaki et al. | 702/19 |
| 7,315,785 B1* | 1/2008 | Nozaki et al. | 702/19 |
| 7,372,941 B2* | 5/2008 | Ivanisevic et al. | 378/70 |
| 7,401,094 B1 | 7/2008 | Kesler | |
| 7,805,437 B1* | 9/2010 | Andersson et al. | 707/722 |
| 2002/0055840 A1* | 5/2002 | Yamada et al. | 704/245 |
| 2003/0110181 A1* | 6/2003 | Schuetze et al. | 707/103 R |
| 2003/0211475 A1* | 11/2003 | Roberts | 435/6 |
| 2003/0228679 A1* | 12/2003 | Smith | A01N 63/00 435/235.1 |
| 2004/0002818 A1* | 1/2004 | Kulp et al. | 702/20 |
| 2004/0018506 A1* | 1/2004 | Koehler | C12Q 1/6858 435/6.12 |
| 2004/0103111 A1* | 5/2004 | Miller | G02B 27/017 |
| 2004/0126840 A1* | 7/2004 | Cheng et al. | 435/69.1 |
| 2004/0126940 A1* | 7/2004 | Inoue | 438/149 |
| 2004/0159783 A1* | 8/2004 | Gavin et al. | 250/282 |
| 2005/0026188 A1* | 2/2005 | Van Kessel | C07H 21/00 435/6.12 |
| 2005/0050033 A1 | 3/2005 | Thomas et al. | |
| 2005/0108285 A1* | 5/2005 | Chickering | G06T 11/206 |
| 2005/0240563 A1* | 10/2005 | Domany et al. | 707/1 |
| 2005/0287544 A1* | 12/2005 | Bertucci et al. | 435/6 |
| 2006/0015265 A1* | 1/2006 | Raich | 702/22 |
| 2006/0028471 A1* | 2/2006 | Kincaid et al. | 345/440 |
| 2006/0088823 A1* | 4/2006 | Haab et al. | 435/6 |
| 2006/0184461 A1* | 8/2006 | Mori | 706/13 |
| 2007/0016095 A1* | 1/2007 | Low | A61B 5/048 600/544 |
| 2007/0105105 A1* | 5/2007 | Clelland et al. | 435/6 |
| 2007/0112755 A1* | 5/2007 | Thompson et al. | 707/5 |
| 2007/0192308 A1* | 8/2007 | Wei et al. | 707/5 |
| 2007/0212700 A1* | 9/2007 | Ranganathan et al. | 435/6 |
| 2008/0120051 A1* | 5/2008 | Ivanisevic et al. | 702/67 |
| 2008/0126523 A1* | 5/2008 | Tantrum et al. | 709/223 |
| 2008/0171323 A1* | 7/2008 | Banchereau et al. | 435/6 |
| 2008/0195322 A1* | 8/2008 | Altschuler et al. | 702/19 |
| 2008/0201397 A1* | 8/2008 | Peng et al. | 708/308 |
| 2008/0297513 A1* | 12/2008 | Greenhill | G06Q 99/00 345/440 |
| 2009/0006002 A1* | 1/2009 | Honisch | C12Q 1/6858 702/20 |
| 2009/0203588 A1* | 8/2009 | Willman et al. | 514/12 |
| 2009/0215033 A1* | 8/2009 | Khan | C12Q 1/6886 435/6.14 |
| 2010/0011287 A1* | 1/2010 | Osaka | 715/251 |
| 2010/0011309 A1* | 1/2010 | Mitra | G06T 11/20 715/768 |
| 2010/0174732 A1* | 7/2010 | Levy | G06F 17/211 707/768 |
| 2010/0183205 A1* | 7/2010 | Pfleger | A61B 5/16 382/128 |
| 2010/0227802 A1* | 9/2010 | Tang | C07K 14/723 514/20.6 |
| 2010/0328492 A1* | 12/2010 | Fedorovskaya | G06Q 30/02 348/231.2 |
| 2011/0004115 A1* | 1/2011 | Shahaf | A61B 5/04009 600/544 |
| 2011/0078144 A1 | 3/2011 | Helfman et al. | |
| 2011/0078194 A1 | 3/2011 | Helfman et al. | |
| 2011/0293570 A1* | 12/2011 | McSpadden Gardener | A01N 63/00 424/93.4 |

OTHER PUBLICATIONS

D. Delling, T. Pajor, D. Wagner. "Engineering Time-Expanded Graphs for Faster Timetable Information," Internationales Begegnungs—und Forschungszentrum für Informatik (IBFI), Schloss Dagstuhl, Germany, Sep. 2008.*

G. Cormode and S. Muthukrishnan. (hereinafter Cormode) "Radial histograms for spatial streams," Technical Report DIMACSTR: Nov. 2003, Rutgers University, 2003.*

Ma, Patrick CH, Keith CC Chan, and David KY Chiu. "Clustering and re-clustering for pattern discovery in gene expression data." Journal of bioinformatics and computational biology 3.02 (2005): 281-301.*

Eisen, Michael B., et al. "Cluster analysis and display of genome-wide expression patterns." Proceedings of the National Academy of Sciences 95.25 (1998): 14863-14868.*

Parkin, Andrew, et al. "Identifying structural motifs in inter-molecular contacts using cluster analysis Part 1. Interactions of carboxylic acids with primary amides and with other carboxylic acid groups." CrystEngComm 8.3 (2006): 257-264.*

West, Julia M., et al. "eyePatterns: software for identifying patterns and similarities across fixation sequences." Proceedings of the 2006 symposium on Eye tracking research & applications. ACM, 2006.*

Alacam, O., et al., "A usability study of WebMaps witheye tracking tool: The effects of iconic representation of information." In HCII 2009, Spring-Verlag (2009), LNCS 5610, 12-21.

Aula, A., et al., "Eye-tracking Reveals the Personal Styles for Search Result Evaluation," in Proceedings of Human-Computer Interaction, Tampere Unit for Computer-Human Interaction (TAUCHI), 2005, pp. 135-138, [Can also be found in Proceedings of INTERACT 2005, Int. Fed. Info Proc., pp. 1058-1061.].

Bednarik, R., et al., "Temporal Eye-Tracking Data: Evolution of Debugging Strategies with Multiple Representations," in proceedings of 2008 Symposium on Eye Tracking Research & Applications, Savannah, Georgia, Mar. 26-28, 2008, pp. 99-102, ACM Press, Copyright 2008.

Beymer, D., et al., "WebGazeAnalyzer: A System for Capturing and Analyzing Web Reading Behavior Using Eye Gaze," in Proceedings of CHI 2005, Portland, Oregon, USA, Apr. 2-7, 2005, pp. 1913-1916, ACM Press, Copyright 2005.

Bojko, A., "Informative or Misleading? Heatmaps Deconstructed," J.A. Jacko (Ed.): Human-Computer Interaction, Part I, HCII 2009, LNCS 5610, 2009, pp. 30-39, Springer-Verlag Berlin Heidelberg.

Bojko, A., "Using Eye Tracking to Compare Web Page Designs: A Case Study," Journal of Usability Studies, May 2006, pp. 112-120, Issue 3, vol. 1.

Church, K., et al., "Dotplot: a Program for Exploring Self-Similarity in Millions of Lines of Text and Code," The Journal of Computational and Graphical Statistics, 1993, 12 pages (pp. 153-174 in publication), vol. 2, No. 2.

Cinar, M., "Eye Tracking Method to Compare the Usability of University Web Sites: A Case Study," M. Kurosu (Ed.): Human Centered Design, HCII 2009, LNCS 5619, 2009, pp. 671-678, Springer-Verlag Berlin Heidelberg. .

Cutrell, E., et al., "What Are You Looking for? An Eye-tracking Study of Information Usage in Web Search," in Proceedings of CHI 2007, San Jose, California, USA, Apr. 28-May 3, 2007, 10 pages (pp. 407-416 in publication), ACM, Copyright 2007.

Feusner, M., et al., "Testing for Statistically Significant Differences Between Groups of Scan Patterns," in Proceedings of 2008 Symposium on Eye Tracking Research & Applications, Savannah, Georgia, Mar. 26-28, 2008, pp. 43-46, ACM Press, Copyright 2008.

Goldberg, J. H., et al., "Computer Interface Evaluation Using Eye Movements: Methods and Constructs," International Journal of Industrial Ergonomics, 1999, pp. 631-645, vol. 24.

Goldberg, J. H., et al., "Eye Movement-Based Evaluation of the Computer Interface," Advances in Occupational Ergonomics and Safety, S. Kumar, (Ed.), 1998, pp. 529-532, IOS Press.

Goldberg, J. H., et al., "Eye Tracking in Web Search Tasks: Design Implications," in Proceedings of 2002 Symposium on Eye Tracking Research & Applications, ACM Press, 2002, 8 pages.

Granka, L., et al., "Location Location Location: Viewing Patterns on WWW Pages," in Proceedings of the 2006 Symposium on Eye Tracking Research & Applications, San Diego, California, Mar. 27-29, 2006, p. 43, ACM Press, Copyright 2006.

(56) References Cited

OTHER PUBLICATIONS

Guan, Z., et al., "An Eye Tracking Study of the Effect of Target Rank on Web Search," in Proceedings of CHI 2007, San Jose, California, USA, Apr. 28-May 3, 2007, 4 pages (pp. 417-420 in publication), ACM Press, Copyright 2007.
Habuchi, Y., et al., "Comparison of Eye Movements in Searching for Easy-to-Find and Hard-to-Find Information in a Hierarchically Organized Information Structure," in Proceedings of the 2008 Symposium on Eye Tracking Research & Applications, Savannah, Georgia, Mar. 26-28, 2008, pp. 131-134, ACM Press, Copyright 2008.
Helfman, J. I., "Similarity Patterns in Language," Proceedings of the IEEE Symposium on Visual Language, 1994, 3 pages (pp. 173-175 in publication), IEEE Press.
Hembrooke, H., et al., "Averaging Scan Patterns and What They Can Tell Us," in Proceedings of the 2006 symposium on Eye Tracking Research & Applications, San Diego, California, Mar. 27-29, 2006, p. 41, ACM Press, Copyright 2006.
Huang, Y., et al., "Rapid and Sensitive Dot-matrix Methods for Genome Analysis," Bioinformatics Advance Access, Jan. 22, 2004, pp. 460-466, vol. 20, No. 4, Oxford University Press, Copyright 2004, downloaded on Mar. 15, 2010 from URL : http://bioinformatics.oxfordjournals.org.
Josephson, S., et al., "Visual Attention to Repeated Internet Images: Testing the Scanpath Theory on the World Wide Web," in Proceedings of the 2002 Symposium on Eye Tracking Research & Applications, New Orleans, Louisiana, USA, pp. 43-49, ACM Press, Copyright 2002.
Levenshtein, V. I., "Binary Codes Capable of Correcting Deletions, Insertions, and Reversals," Cybernetics and Control Theory, Doklady Physics, Feb., 1966, pp. 707-710, vol. 10, No. 8.
Mankowski, W. C., et al., "Finding Canonical Behaviors in User Protocols," in Proceedings of CHI 2009, Boston, MA, USA, Apr. 4-9, 2009, 4 pages, ACM Press, Copyright 2009.
Matsuda, Y., et al., "An Analysis of Eye Movements During Browsing Multiple Search Results pp.," J.A. Jacko (Ed.): Human-Computer Interaction, Part I, HCII, LNCS 5610, pp. 121-130, Copyright 2009 Springer-Verlag Berlin Heidelberg, Copyright 2009.
Myers, C. W., "Toward a Method of Objectively Determining Scanpath Similarity," [Abstract], Journal of Vision, Sep. 23, 2005, 2 pages, vol. 5, No. 8, Abstract 693, downloaded on Jan. 5, 2010 from URL: http://www.journalofvision.org/5/8/693/.
Najemnik, J., et al., "Optimal Eye Movement Strategies in Visual Search," Nature, Mar. 17, 2005, pp. 387-391, vol. 434, Copyright 2005 Nature Publishing Group.
Salvucci, D. D., et al., "Identifying Fixations and Saccades in Eye-Tracking Protocols," in Proceedings of the 2000 Symposium on Eye Tracking Research & Applications, Palm Beach Gardens, FL, USA, pp. 71-78, ACM Press, Copyright 2000.
Santella, A., et al., "Robust Clustering of Eye Movement Recordings for Quantification of Visual Interest," in Proceedings of the 2004 Symposium on Eye Tracking Research & Applications, San Antonio, Texas, 2004, pp. 27-34, ACM Press, Copyright 2004.
Smith, T. F., et al., "Identification of Common Molecular Subsequences," Reprinted from Journal of Molecular Biology, 1981, pp. 195-197, vol. 147, Academic Press, Copyright 1980.
Tufte, E. R., "Beautiful Evidence," Sparklines: Intense Word-Sized Graphics, Graphic Press LLC, Cheshire, CT., pp. 46-63, Copyright 2006.
Tufte, E. R., "The Visual Display of Quantitative Information," Theory of Data Graphics, Graphic Press LLC, Cheshire, CT., pp. 170-175, Copyright 1983.
Wattenberg, M., "Arc Diagrams: Visualizing Structure in Strings," in Proceedings of the IEEE Symposium on Information Visualization (InfoVis'02), 2002, 8 pages, IEEE Computer Society.
Werman, M., et al., "A Bayesian Method for Fitting Parametric and Nonparametric Models to Noisy Data," IEEE Transactions on Pattern Analysis and Machine Intelligence, May 2001, pp. 528-534, vol. 23, No. 5, Copyright 2001.
West, J. M., et al., "EyePatterns: Software for Identifying Patterns and Similarities Across Fixation Sequences," in Proceedings of the 2006 Symposium on Eye Tracking Research & Applications, San Diego, California, Mar. 27-29, 2006, pp. 149-154, ACM Press, Copyright 2006.
Wooding, D. S., "Eye Movements of Large Populations: II. Deriving Regions of Interest, Coverage, and Similarity Using Fixation Maps," Behavior Research Methods, Instruments, & Computers, 2002, pp. 518-528, vol. 34, No. 4, Psychonomic Society, Inc., Copyright 2002.
Ding, C., et al., "Cluster Aggregate Inequality and Multi-Level Hierarchical Clustering," Lecture Notes in Computer Science, 12 pages, No. 3721, Oct. 2005.
Downs, G., et al., "Clustering Methods and Their Uses in Computational Chemistry," Reviews in Computational Chemistry, vol. 18, 40 pages, Oct. 2002.
Guralnik, V., et al., "A Scalable Algorithm for Clustering Sequential Data," Proceedings IEEE International Conference on Data Mining, 8 pages, Dec. 2001.
Nguyen, V., et al., "A Comparison of Line Extraction Algorithms using 2D Laser Rangefinder for Indoor Mobile Robotics," IEEE/RSJ International Conference on Intelligent Robots and Systems, 6 pages, Aug. 2005.
U.S. Appl. No. 12/831,615, filed Jul. 7, 2010, Office Action dated Jul. 23, 2012, 18 pages.
Yu, T., et al., "Argo Comparative View," Broad Institute, Sep. 2006, [retrieved on Aug. 24, 2012], 5 pages. Retrieved from: http:www.broadinstitute.org/annotation/argo/help/usecase_comparative/.
U.S. Appl. No. 12/831,641, filed Jul. 7, 2010, Office Action dated Aug. 31, 2012, 13 pages.
U.S. Appl. No. 12/831,615, Advisory Action dated Apr. 18, 2013, 3 pages.
U.S. Appl. No. 12/831,615, Final Office Action dated Jan. 31, 2013, 21 pages.
U.S. Appl. No. 12/831,641, Advisory Action dated May 1, 2013, 3 pages.
U.S. Appl. No. 12/831,641, Final Office Action dated Feb. 19, 2013, 15 pages.
Gonzalez et al., Clustering exact matches of pairwise sequence alignments by weighted linear regression, 2008.
Mabrouk et al., BIOINFTool: Bioinformatics and sequence data analysis in molecular biology using Matlab, 2006.
U.S. Appl. No. 12/831,615, Non Final Office Action dated Jun. 2, 2014, 20 pages.
U.S. Appl. No. 12/831,641, Non-Final Office Action dated Jun. 11, 2014, 19 pages.
Saha et al., Computational Approaches and Tools Used in Identification of Dispersed Repetitive DNA Sequences, Tropical Plant Biol. 1, 2008, pp. 85-96.
U.S. Appl. No. 12/831,641, Final Office Action dated Nov. 28, 2014, 14 pages.
U.S. Appl. No. 12/831,615, Non-Final Office Action dated Apr. 23, 2015, 25 pages.
U.S. Appl. No. 12/831,641, Non-Final Office Action dated May 8, 2015, 16 pages.
U.S. Appl. No. 12/831,615, Advisory Action dated Jan. 23, 2015, 3 pages.
U.S. Appl. No. 12/831,615, Final Office Action dated Oct. 15, 2015, 29 pages.
U.S. Appl. No. 12/831,641, Advisory Action dated Feb. 5, 2015, 3 pages.
U.S. Appl. No. 12/831,641, Final Office Action dated Oct. 16, 2015, 21 pages.
U.S. Appl. No. 12/831,615, Final Office Action dated Nov. 7, 2014, 24 pages.

* cited by examiner

INTERACTIVE DENDROGRAM CONTROLS

CROSS-REFERENCES TO RELATED APPLICATIONS

The present application claims benefit under 35 USC 119(e) of U.S. Provisional Application No. 61/246,385, filed on Sep. 28, 2009 by Helfman et al. and entitled "Interactive Dendrogram Controls," and U.S. Provisional Application No. 61/247,313, filed on Sep. 30, 2009 by Helfman et al. and entitled "Interactive Dendrogram Controls," both of which are incorporated herein by reference for all purposes. The present application is also related to U.S. patent application Ser. No. 12/615,749, filed on Nov. 10, 2009 by Helfman et al. and entitled "Using Dotplots for Comparing and Finding Patterns in Sequences of Data Points" which is also incorporated herein by reference in its entirety for all purposes.

BACKGROUND

Embodiments of the present invention relate to analyzing and presenting a set of data, and more specifically to providing an interactive dendrogram representing the set of data.

Sequential data, i.e., a dataset including sequential information, can represent a variety of different types of data. For example, such a dataset can include product purchases after other purchases, web page requests after other page requests, regions of a document or application viewed after other regions are viewed, etc. The sequence can represent a path, i.e., a sequence of two or more points connected in a particular order.

Analysis of paths is performed in various different fields or domains. For example, in eye tracking analysis, scanpaths representing users' eye movements while viewing a scene may be analyzed to determine high-level scanning strategies. The scanning strategies determined from such an analysis may be used to improve product designs. For example, by studying scanpaths for users viewing a web page, common viewing trends may be determined and used to improve the web page layout. Various other types of analyses on paths may be performed in other fields. Accordingly, new and improved techniques are always desirable for analyzing and presenting data that can provide insight into characteristics of the data and that facilitate comparisons of the data.

BRIEF SUMMARY

Embodiments of the invention provide systems and methods for analyzing and presenting, e.g., displaying, a data set. Analyzing the data set can include grouping or clustering data of the data set that are similar in some way, e.g., similar ranges of quantities, similar categories, etc. and providing an interactive dendrogram representing the clustered data. More specifically, a method for providing an interactive representation of a data set can comprise clustering the data of the data set into a hierarchical set of clustered data. A dendrogram can be generated based on the clustered data and representing a hierarchy of the clustered data and displayed on a page of a user interface. A selection of a depth of the dendrogram can be received via the user interface and the page can be updated based on the selection of the depth of the dendrogram.

For example, the page can include a slider control indicating a currently selected depth level of the dendrogram. The slider control can be integrated with the dendrogram as a single interactive component in the form of a repositionable marker on the dendrogram to indicate the currently selected depth level of the dendrogram. The page may also include a detail view illustrating detailed information for each cluster of the selected level of the dendrogram. In such cases, receiving the selection of the depth of the dendrogram can comprise receiving an indication of a movement of the slider control and updating the page based on the selection of the depth of the dendrogram can comprise updating the detail view.

The dendrogram can comprise a unique identifying negative integer for each cluster. Additionally or alternatively, the dendrogram can comprise a graphical representation of an aggregate value for each cluster and/or an indication of the degree to which the data of the cluster match. For example, the detail view can comprise a table representing details of the clusters at the selected level of the dendrogram. In such cases, the table may include one or more columns listing identifiers for the cluster and data in the cluster. The table may additionally or alternatively include a column including a graphical representation of the cluster and the data in the cluster and/or one or more columns illustrating a time expanded representation of the data. The table may also include one or more columns illustrating a radial histogram for each cluster and data in the cluster.

According to another embodiment, a system can comprise a processor and a memory communicatively coupled with and readable by the processor. The memory can have stored therein a series of instructions which, when executed by the processor, cause the processor to provide an interactive representation of a data set by clustering the data into a hierarchical set of clustered data. A dendrogram can be generated based on the clustered data and representing a hierarchy of the clustered data and displayed on a page of a user interface. A selection of a depth of the dendrogram can be received via the user interface and the page can be updated based on the selection of the depth of the dendrogram.

For example, the page can include a slider control indicating a currently selected depth level of the dendrogram. The slider control can be integrated with the dendrogram as a single interactive component in the form of a repositionable marker on the dendrogram to indicate the currently selected depth level of the dendrogram. The page may also include a detail view illustrating detailed information for each cluster of the selected level of the dendrogram. In such cases, receiving the selection of the depth of the dendrogram can comprise receiving an indication of a movement of the slider control and updating the page based on the selection of the depth of the dendrogram can comprise updating the detail view.

The dendrogram can comprise a unique identifying negative integer for each cluster. Additionally or alternatively, the dendrogram can comprise a graphical representation of an aggregate value for each cluster and/or an indication of the degree to which the data of the cluster match. For example, the detail view can comprise a table representing details of the clusters at the selected level of the dendrogram. In such cases, the table may include one or more columns listing identifiers for the cluster and data in the cluster. The table may additionally or alternatively include a column including a graphical representation of the cluster and data in the cluster and/or one or more columns illustrating a time expanded representation of the data. The table may also include one or more columns illustrating a radial histogram for each cluster and data in the cluster.

According to yet another embodiment, a machine-readable medium can have stored thereon a series of instructions which, when executed by a processor, cause the processor to provide an interactive representation of a data set by clustering the data into a hierarchical set of clustered data. A dendrogram can be generated based on the clustered data and representing a hierarchy of the clustered data and displayed on a page of a user interface. A selection of a depth of the dendrogram can be received via the user interface and the page can be updated based on the selection of the depth of the dendrogram.

For example, the page can include a slider control indicating a currently selected depth level of the dendrogram. The slider control can be integrated with the dendrogram as a single interactive component in the form of a repositionable marker on the dendrogram to indicate the currently selected depth level of the dendrogram. The page may also include a detail view illustrating detailed information for each cluster of the selected level of the dendrogram. In such cases, receiving the selection of the depth of the dendrogram can comprise receiving an indication of a movement of the slider control and updating the page based on the selection of the depth of the dendrogram can comprise updating the detail view.

The dendrogram can comprise a unique identifying negative integer for each cluster. Additionally or alternatively, the dendrogram can comprise a graphical representation of an aggregate value for each cluster and/or an indication of the degree to which the data of the cluster match. For example, the detail view can comprise a table representing details of the clusters at the selected level of the dendrogram. In such cases, the table may include one or more columns listing identifiers for the cluster and data in the cluster. The table may additionally or alternatively include a column including a graphical representation of the cluster and data in the cluster and/or one or more columns illustrating a time expanded representation of the data. The table may also include one or more columns illustrating a radial histogram for each cluster and data in the cluster.

DETAILED DESCRIPTION

Figure 1:
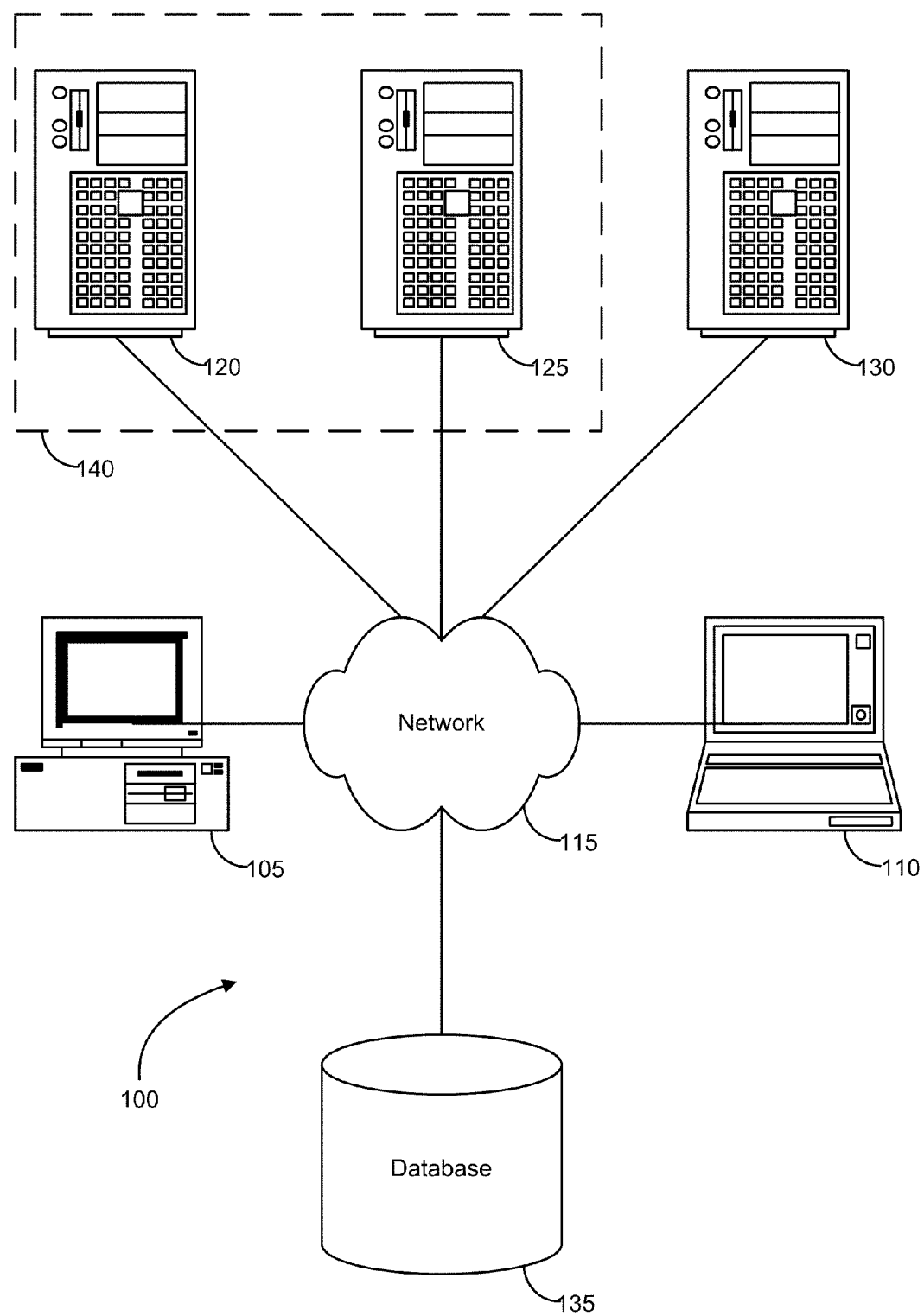
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for presenting groups or clusters of data in an interactive manner. More specifically, embodiments of the present invention provide for interactive control of data presented in a dendrogram. Large amounts of data can be organized and understood by grouping or clustering data that are similar in some way, e.g., similar ranges of quantities, similar categories, etc. Hierarchical clustering can be defined as a form of binary clustering in which each sub-cluster has two constituents, either an un-clustered data value (i.e., a leaf) or another binary cluster. A dendrogram is a type of binary tree diagram that is useful for displaying hierarchical clusters. A dendrogram can have a line or other indication "slicing" the dendrogram, i.e., determining or selecting a specific portion of the dataset into a set of hierarchical clusters. For example, a line that slices the dendrogram near its leaves corresponds to a large number of small clusters compared to a line that slices the same dendrogram near its root, which corresponds to a smaller number of large clusters.

Embodiments of the present invention provide for using a dendrogram with an interactive thumb to dynamically explore clustering. That is, embodiments described herein provide an interactive slicing in the form of a draggable thumb or slider control on a dendrogram displaying clustered data. Sliding the dendrogram thumb different amounts allows the user to control the depth at which the dendrogram is sliced which, in turn, determines the current set of clusters of the dataset that are displayed.

Data to be clustered may consist of sequences. A sequence may be any list of tokens or symbols in a particular order. Examples of sequences can include but are not limited to words in a query, words in a document, symbols in a computer program's source code, scanpaths, i.e., sequences of eye tracking fixation points as determined by an eye tracking system, sequences of requested URLs in a user's web browsing session, sequences of requested URLs in a web server's log file, etc. As the term is used herein, a path may be defined as a sequence of two or more points. The first point in the sequence of points may be referred to as the start point of the path and the last point in the sequence may be referred to as the end point of the path. The portion of a path between any two consecutive points in the sequence of points may be referred to as a path segment. A path may comprise one or more segments.

Thus, there are different types of paths considered to be within the scope of the term as used herein. Examples described below have been described with reference to a specific type of path, referred to as a scanpath, which is used to track eye movements. A scanpath is a path that an eye follows when viewing a scene. A scanpath is defined by a sequence of fixation points (or gaze locations). A path segment between two consecutive fixation points in the sequence of fixation points is referred to as a saccade. A scanpath is thus a sequence of fixation points connected by saccades during scene viewing where the saccades represent eye movements between fixation points. For purposes of simplicity, the scanpaths described below are 1- or 2-dimensional paths. The teachings of the present invention may however also be applied to paths in multiple dimensions.

However, it should be understood that, while embodiments of the present invention have been described in context of scanpaths, this is not intended to limit the scope of the present invention as recited in the claims to scanpaths. Teachings of the present invention may also be applied to other types of paths or sequences occurring in various different domains such as a stock price graph, a path followed by a car between a start and an end destination, and the like. Furthermore, embodiments of the present invention are not limited to using sequential data. Rather, the teachings of the present invention may be applied to any set of data that may be hierarchically clustered. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java™ servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
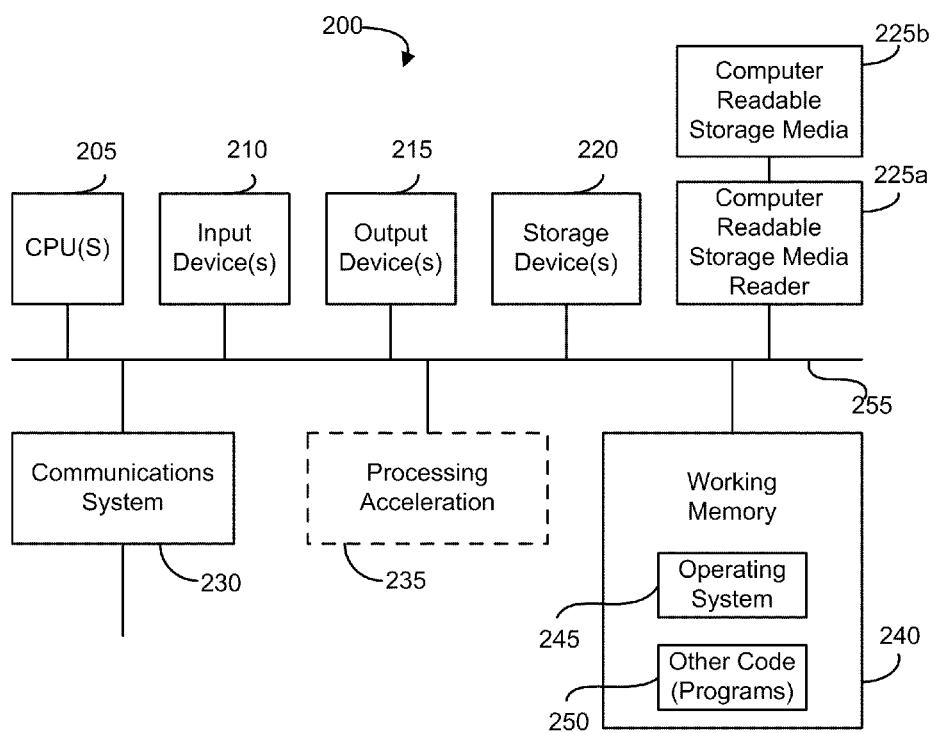
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention provide for analyzing a set of data including but not limited to sequential data, for example, paths such as eye tracking data including scanpaths representing users' eye movements while viewing a stimulus image or other scene. The eye tracking data can represent a number of different scanpaths and can be analyzed, for example, to find patterns or commonality between the scanpaths. According to one embodiment, analyzing eye tracking data with a path analysis system such as the computer system 200 described above can comprise receiving the eye tracking data at the path analysis system. The eye tracking data, which can be obtained by the system in a number of different ways as will be described below, can include a plurality of scanpaths, each scanpath representing a sequence of regions of interest on a scene such as a stimulus image displayed by the system. The sequential data can be hierarchically clustered based on similarities in the data, e.g., similar ranges of quantities, similar categories, etc. The clustered data can then be used to generate a representation thereof. As described in greater detail below, the representation can comprise a dendrogram with interactive controls for indicating a level of the hierarchy of clusters to be presented or displayed.

Figure 3:
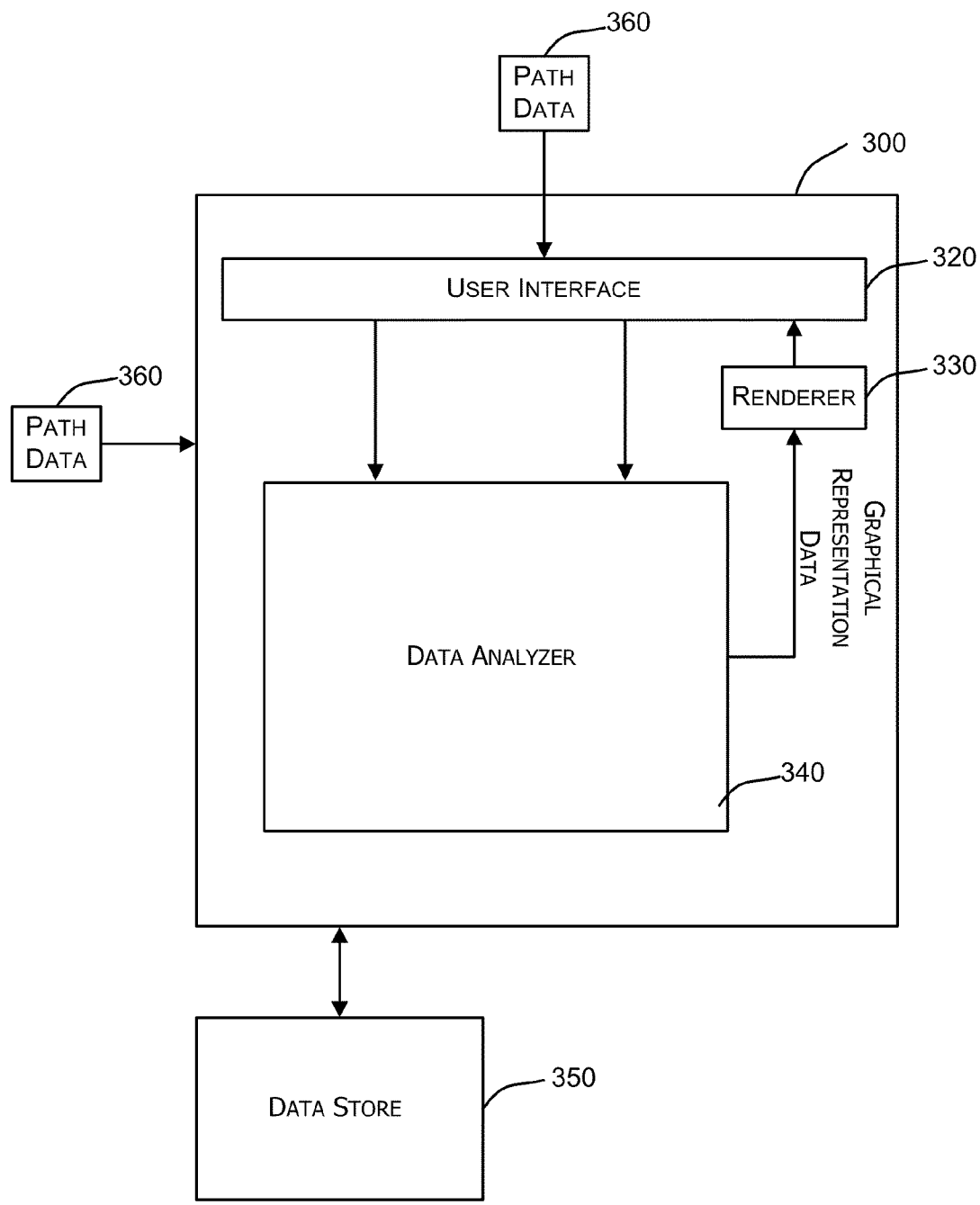
FIG. 3 is a block diagram illustrating, at a high-level, functional components of an exemplary system for analyzing eye tracking data in which embodiments of the present invention may be implemented.

FIG. 3 is a block diagram illustrating, at a high-level, functional components of an exemplary system for analyzing eye tracking data in which embodiments of the present invention may be implemented. In this example, the path analysis system 300 comprises several components including a user interface 320, a renderer 330, and a data analyzer 340. The various components may be implemented in hardware, or software (e.g., code, instructions, program executed by a processor), or combinations thereof. Path analysis system 300 may be coupled to a data store 350 that is configured to store data related to processing performed by system 300. For example, path data (e.g., scanpath data) may be stored in data store 350.

User interface 320 provides an interface for receiving information from a user of path analysis system 300 and for outputting information from path analysis system 300. For example, a user of path analysis system 300 may enter path data 360 for a path to be analyzed via user interface 320. Additionally or alternatively, a user of path analysis system 300 may enter commands or instructions via user interface 320 to cause path analysis system 300 to obtain or receive path data 360 from another source. It should be noted, however, that a user interface is entirely optional to the present invention, which does not rely on the existence of a user interface in any way.

System 300 may additionally or alternatively receive path data 360 from various other sources. In one embodiment, the path data may be received from sources such as from an eye tracker device. For example, information regarding the fixation points and saccadic eye movements between the fixation points, i.e., path data 360, may be gathered using eye tracking devices such as devices provided by Tobii (e.g., Tobii T60 eye tracker). An eye-tracking device such as the Tobii T60 eye tracker is capable of capturing information related to the saccadic eye activity including location of fixation points, fixation durations, and other data related to a scene or stimulus image, such as a webpage for example, while the user views the scene. Such an exemplary user interface is described in greater detail below with reference to FIG. 4 The Tobii T60 uses infrared light sources and cameras to gather information about the user's eye movements while viewing a scene.

The path data may be received in various formats, for example, depending upon the source of the data. In one embodiment and regardless of its exact source and/or format, path data 360 received by system 300 may be stored in data store 350 for further processing.

Path data 360 received by system 300 from any or all of these sources can comprise data related to a path or plurality of paths to be analyzed by system 300. Path data 360 for a path may comprise information identifying a sequence of points included in the path, and possibly other path related information. For example, for a scanpath, path data 360 may comprise information related to a sequence of fixation points defining the scanpath. Path data 360 may optionally include other information related to a scanpath such as the duration of each fixation point, inter-fixation angles, inter-fixation distances, etc. Additional details of exemplary scanpaths as they relate to an exemplary stimulus image are described below with reference to FIG. 4.

Data analyzer 340 can be configured to process path data 360 and, for example, identify patterns within the path data. For example, data analyzer 340 can receive a set of path data 360 representing multiple scanpaths and can analyze these scanpaths to identify patterns, i.e., similar or matching portions therein.

Path analysis system 300 can also include renderer 330. Renderer 330 can be configured to receive output from data analyzer 340 and provide, e.g., via user interface 320, a display or other representation of the results. For example, renderer 330 may provide a graphical representation of the hierarchically clustered data. According to one embodiment, the representation can comprise a dendrogram with interactive controls for indicating a level of the hierarchy of clusters to be presented or displayed as described in greater detail below with reference to FIGS. 6 and 7A-7E.

As noted above, the path data 360, i.e., information regarding the fixation points and saccadic eye movements between the fixation points, may be gathered using eye tracking devices such as devices capable of capturing information related to the saccadic eye activity including location of fixation points, fixation durations, and other data related to a scene or stimulus image while the user views the scene or image. Such a stimulus image can comprise, for example, a webpage or other user interface which, based on analysis of various scanpaths may be evaluated for possible improvements to the format or layout thereof.

Figure 4:
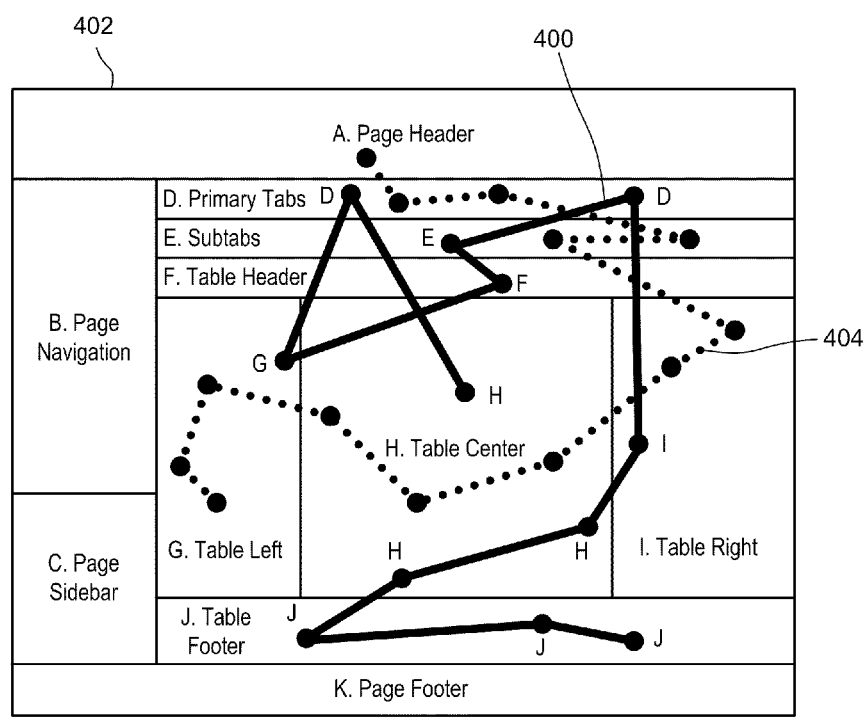
FIG. 4 illustrates an exemplary stimulus image of a user interface which may be used with embodiments of the present invention and a number of exemplary scanpaths.

FIG. 4 illustrates an exemplary stimulus image of a user interface which may be used with embodiments of the present invention and a number of exemplary scanpaths. It should be noted that this stimulus image and user interface are provided for illustrative purposes only and are not intended to limit the scope of the present invention. Rather, any number of a variety of different stimulus images, user interfaces, or means and/or methods of obtaining a query sequence are contemplated and considered to be within the scope of the present invention.

In this example, the image, which can comprise for example a web page 402 or other user interface of a software application, includes a number of elements which each, or some of which, can be considered a particular region of interest. For example, webpage 402 may be considered to comprise multiple regions such as: A (page header), B (page navigation area), C (page sidebar), D (primary tabs area), E (subtabs area), F (table header), G (table left), H (table center), I (table right), J (table footer), and K (page footer). Webpage 402 may be displayed on an output device such as a monitor and viewed by the user.

FIG. 4 also depicts exemplary scanpaths 400 and 404 representing eye movements of one or more users while viewing the webpage 402 and obtained or captured by an eye tracking device as described above. Paths 400 and 404 shows the movements of the users' eyes across the various regions of page 402. The circles depicted in FIG. 4 represent fixation points. A fixation point marks a location in the scene where the saccadic eye movement stops for a brief period of time while viewing the scene. In some cases, a fixation point can be represented by, for example, a label or name identifying a region of interest of the page in which the fixation occurs. So for example, scanpath 400 depicted in FIG. 4 may be represented by the following sequence of region names {H, D, G, F, E, D, I, H, H, J, J, J}.

The scanpath data gathered by an eye tracker can be used by embodiments of the present invention to provide a graphical representation of the data. For example, analyzing the data can include performing hierarchical clustering of the data by merging the "closest" or most similar data values into a binary cluster, storing an aggregate value in the new cluster, and repeating the process until all of the data are merged into a single cluster as described in greater detail below with reference to FIG. 5. A graphical representation of the hierarchically clustered sequential data can then be provided. According to one embodiment, the representation can comprise a dendrogram with interactive controls for indicating a level of the hierarchy of clusters to be presented or displayed as described in greater detail below with reference to FIGS. 6 and 7A-7E.

It should be understood that the present invention may also be applied to other types of paths or sequences occurring in various different domains such as a stock price graph, a path followed by a car between a start and an end destination, and the like. In other examples, the data may represent protein, DNA, and RNA sequences. In another example, the data can represent text sequences. Furthermore, embodiments of the present invention are not limited to using sequential data. Rather, the teachings of the present invention may be applied to any set of data that may be hierarchically clustered Regardless of exactly what type dataset is used, embodiments described herein can include hierarchically clustering data by analyzing the data to identify pair-wise matches therein and clustering together data pairs that have the closest matches. For example, when the data set represents sequential data, hierarchically clustering the sequential data can include analyzing the sequences represented in the data to identify pair-wise matches therein and clustering together sequences that have the longest sequential matches. According to one embodiment, identifying such matches can be based on a line fitting technique, including but not limited to, a regression process performed on the data. For example, the regression process can include, but is not limited to a least-squares regression. Hierarchical clustering can further comprise repeatedly identifying the two closest clusters from the data and merging the two closest clusters into a single cluster until only one cluster remains.

Figure 5:
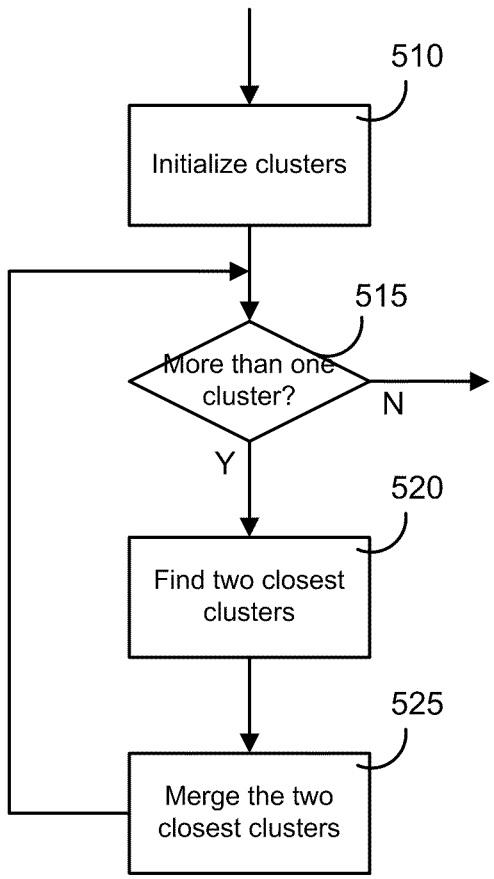
FIG. 5 is a flowchart illustrating an exemplary process for hierarchical sequential clustering according to one embodiment of the present invention.

FIG. 5 is a flowchart illustrating an exemplary process for hierarchical clustering according to one embodiment of the present invention. In this example, the process begins with initializing 510 a number of clusters in the data. For example, initializing 510 the number of clusters can comprise initializing the number of clusters to one cluster per sequence if the data comprises sequential data.

A determination 515 can be made as to whether more than one cluster exists within the data. If 515 more than one cluster exists, the two closest clusters can be identified. According to one embodiment, identifying two closest clusters can be based on a line fitting technique applied to the data. For example, dotplots may be constructed from the data and a line fitting technique can comprise a regression technique such as a least-square regression. Once matches are determined, they may be ranked by the degree of matching between pairs. For example, when clustering sequential data, matches between sequences can be ranked by their "length", i.e. their total number of matching tokens. Sequences with "longer" matches may be considered "closer", and the clusters with sequences that have the longest matches may be considered the closest.

Once identified 520, two closest clusters can be merged 525 into a single cluster. Merging the two closest clusters can comprise assigning a unique identifier, e.g., a sequential negative integer, to the merged cluster, copying the closest distance and matching data offset to the merged cluster, and assigning a cluster identifier to the merged cluster. The cluster identifier can be the identifier of the child cluster that matches the most other clusters in the dataset.

Once the two closest clusters are merged 525, processing can return to determining 515 whether more than one cluster exists. If 515 more than one cluster remains, identifying 520 the two closest clusters and merging 525 the two closest clusters into a single cluster can be repeated until a single cluster remains. At this point clustering can end and processing can pass to, for example, displaying or reporting results of the clustering or other processes. As noted above, embodiments of the present invention provide for interactive control of data presented in a dendrogram. The dendrogram can have a line or other indication "slicing" the dendrogram, i.e., determining or selecting a specific portion of the dataset into a set of hierarchical clusters. For example, a line that slices the dendrogram near its leaves corresponds to a large number of small clusters compared to a line that slices the same dendrogram near its root, which corresponds to a smaller number of large clusters. Embodiments of the present invention provide for using a dendrogram with an interactive thumb to dynamically control clustering. That is, embodiments described herein provide an interactive slicing in the form of a draggable thumb or slider control on a dendrogram displaying clustered data. Sliding the dendrogram thumb different amounts allows the user to control the depth at which the dendrogram is sliced which, in turn, determines the current set of clusters of the dataset that are displayed.

Figure 6:
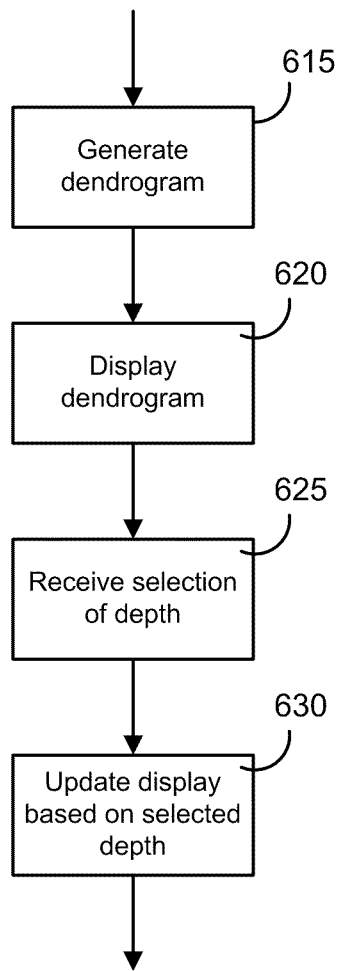
FIG. 6 is a flowchart illustrating a process for providing interactive dendrogram control according to one embodiment of the present invention.

FIG. 6 is a flowchart illustrating a process for providing interactive dendrogram control according to one embodiment of the present invention. In this example, the process begins with generating 615 a dendrogram. A dendrogram can be generated 615 based on the clustered data and representing a hierarchy of the clustered data. The dendrogram can then be displayed 620 on a page of a user interface. A selection of a depth of the dendrogram can be received 625 via the user interface. For example and as will be described in greater detail below, the selection of the depth of the dendrogram can be based on a user election or manipulation, e.g., via a mouse or other pointing device, of a control of the user interface. The page can be updated 630 based on the selection of the depth of the dendrogram. As noted, clustering of the data in the data set can be performed dynamically based on the level at which the dendrogram is sliced. Thus, updating the page can also include clustering/re-clustering the data as described above with reference to FIG. 5 and based on the selected level.

To further illustrate various embodiments of the present invention, an exemplary user interface will be described. However, it should be understood that the user interface described here is offered by way of example only and is not intended to limit the scope of the present invention. Rather, it should be understood that in various other implementations, details of the interface can vary significantly from those shown here without departing from the scope of the present invention. For example, the type, amount, details, etc. of the information displayed, the format or layout of the interface, the way in which the interface is navigated, the way and/or degree with which the user may interact with the interface, etc. can vary depending upon the exact implementation.

Figure 7A:
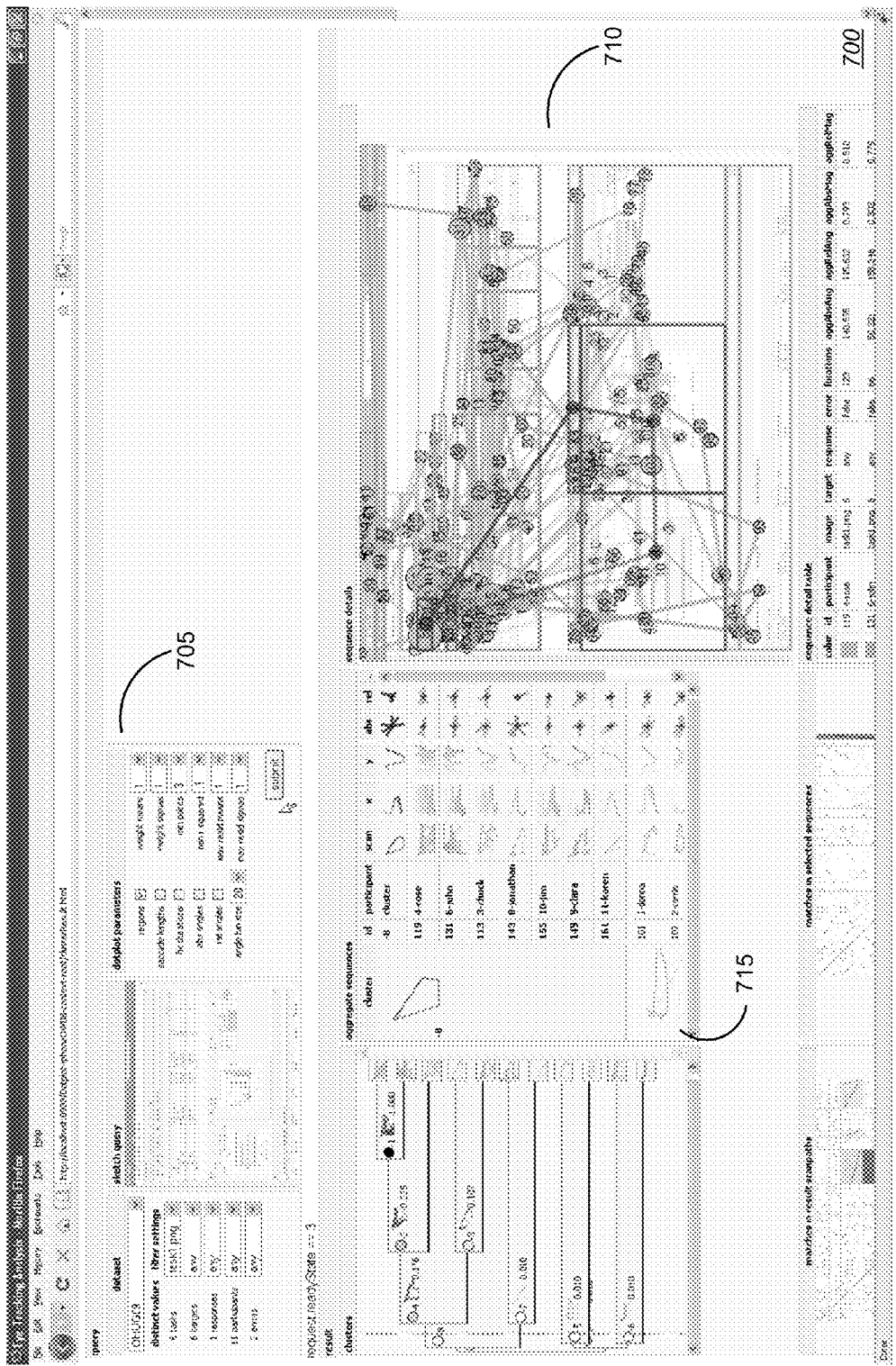
FIGS. 7A-7E are screenshots illustrating various views of an exemplary user interface for interactive dendrogram control according to one embodiment of the present invention.

FIGS. 7A-7E are screenshots illustrating various views of an exemplary user interface for interactive dendrogram control according to one embodiment of the present invention. More specifically, FIG. 7A illustrates a page 700, such as a web page or other page that may be displayed by a software application. As shown here, the page can include a number of frames or panels 705, 710, and 715. These can include a data set selection and filtering panel 705 and a results panel 715, which could include a cluster details panel 710. Details of the results panel 715 will be described below with reference to FIGS. 7C-7E. The data set selections and filtering panel 705 can include a number of elements such as textboxes, combo boxes, checkboxes, etc. for selecting or defining a query or other selection criteria for the data. For example, the data set selections and filtering panel 705 can include elements for defining or selecting a particular dataset, for filtering a dataset, for selecting some or all of a set of data that may be displayed, etc. The cluster details panel 710 can include a graphical representation of clustered data. This representation may include a representation of data e in a selected cluster or level of clusters. For example, the clustered data can comprise eye tracking data, i.e., data obtained from a system for tracking the movements of a human eye. In such cases, tokens of the clustered data, represented here by the numbered circles, can represent fixation points, e.g., on particular regions of interest on a user interface, shown here as the shaded background of the cluster details panel 710, and the sequences can represent scanpaths or movements of the eye between the fixation points, illustrated here by the lines between the numbered circles or fixation points. According to one embodiment, one of the sequences can be highlighted, shaded, colored, or otherwise made distinguishable from the other sequences to indicate that sequence as a representative sequence for the cluster, e.g., a sequence with a most number matches with other sequences in the cluster. According to one embodiment, such matching can be determined based on a line fitting process.

Figure 7B:
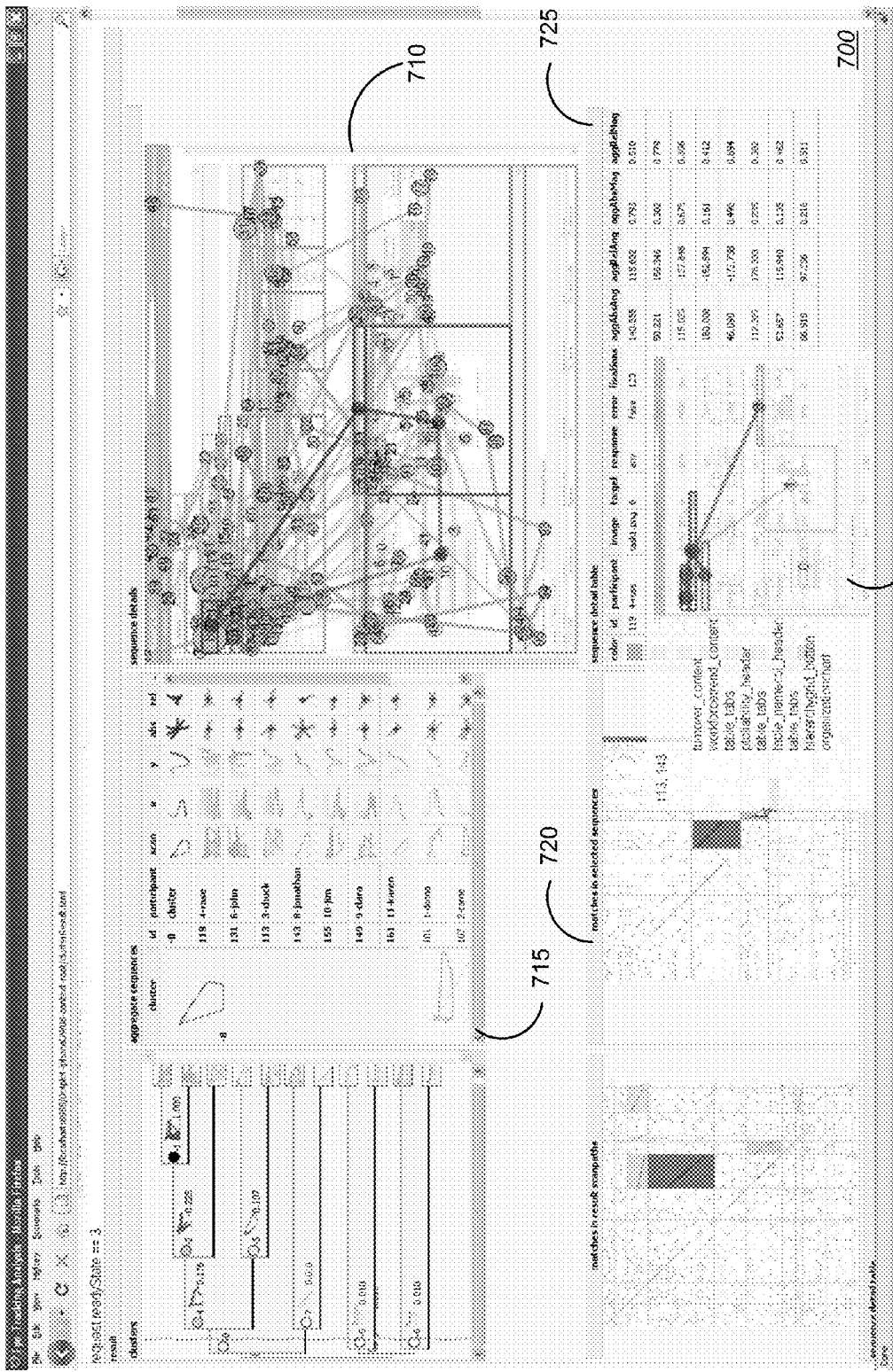

FIG. 7B is a screenshot of the same page 700 as illustrated in FIG. 7A but scrolled down to reveal additional panels 720, 725, and 730 of the page 700. These panels include a dotplot of the selected sequences panel 720, a selected sequence details table panel 725, and a matching sequence list panel 730. The dotplot panel 720 can include a dotplot for each pair of selected sequences. These dotplots can include shading, highlighting, coloring, or other effects to indicate a degree to which sequences in a particular portion of the dotplot match each other. For example, a darker shade or color may indicate a higher degree of matching between sequences. The selected sequence details table panel 725 can include tabular representations. By hovering over or clicking on a particular matching sequence of the dotplot with the mouse pointer, the matching sequence list panel 730 can include a textual list of the tokens comprising the matching sequence. If the data represents eye tracking data and the sequences represent scanpaths, the textual list of the matching sequence list panel 730 can comprise a list of the names of the particular regions of interests in which the fixation points of the scanpath are located. In this case, it is also possible to show a visual representation of a scanpath comprised of the matches, which in the case of eye tracking data are typically region identifiers.

Figure 7C:
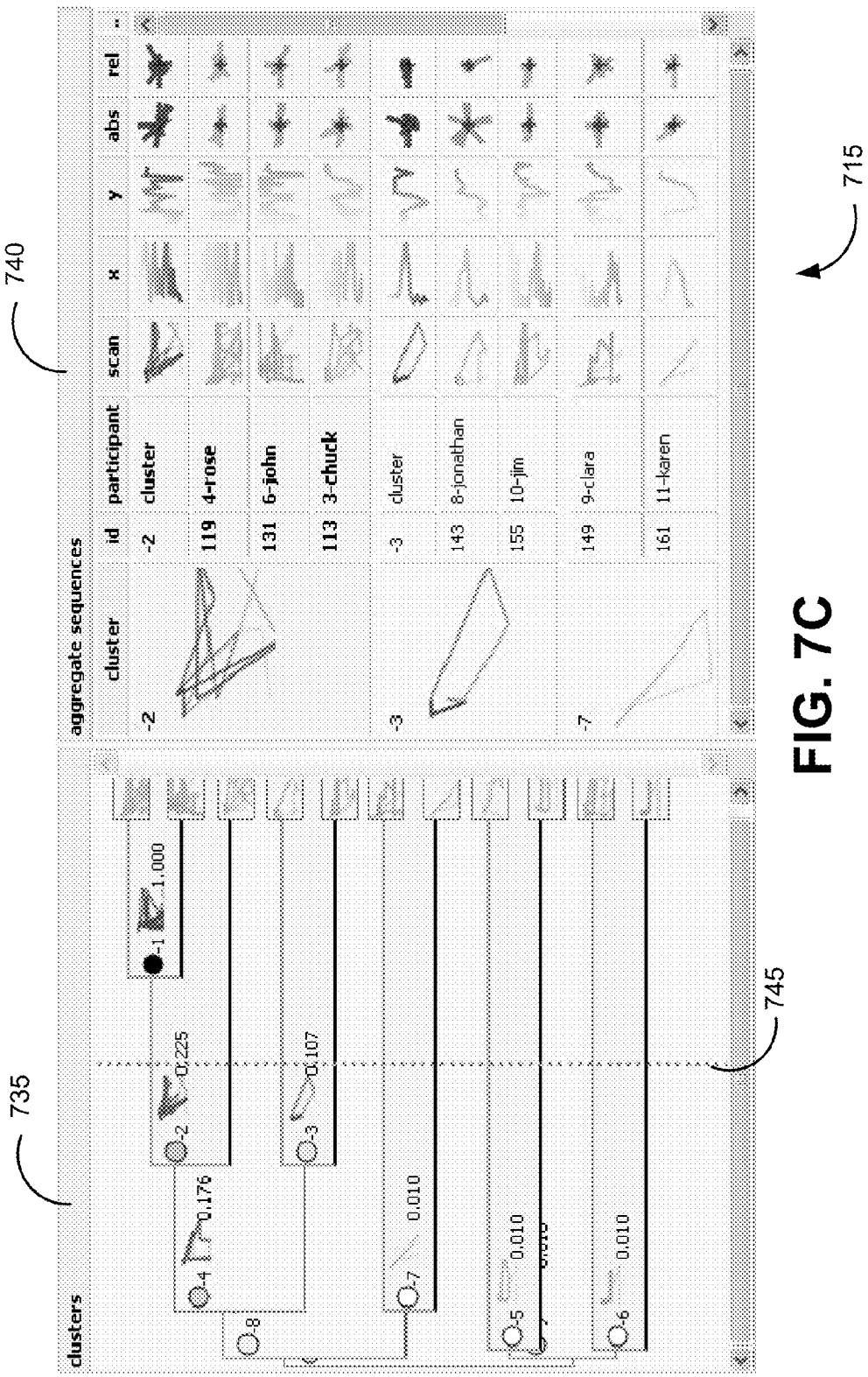
Figure 7D:
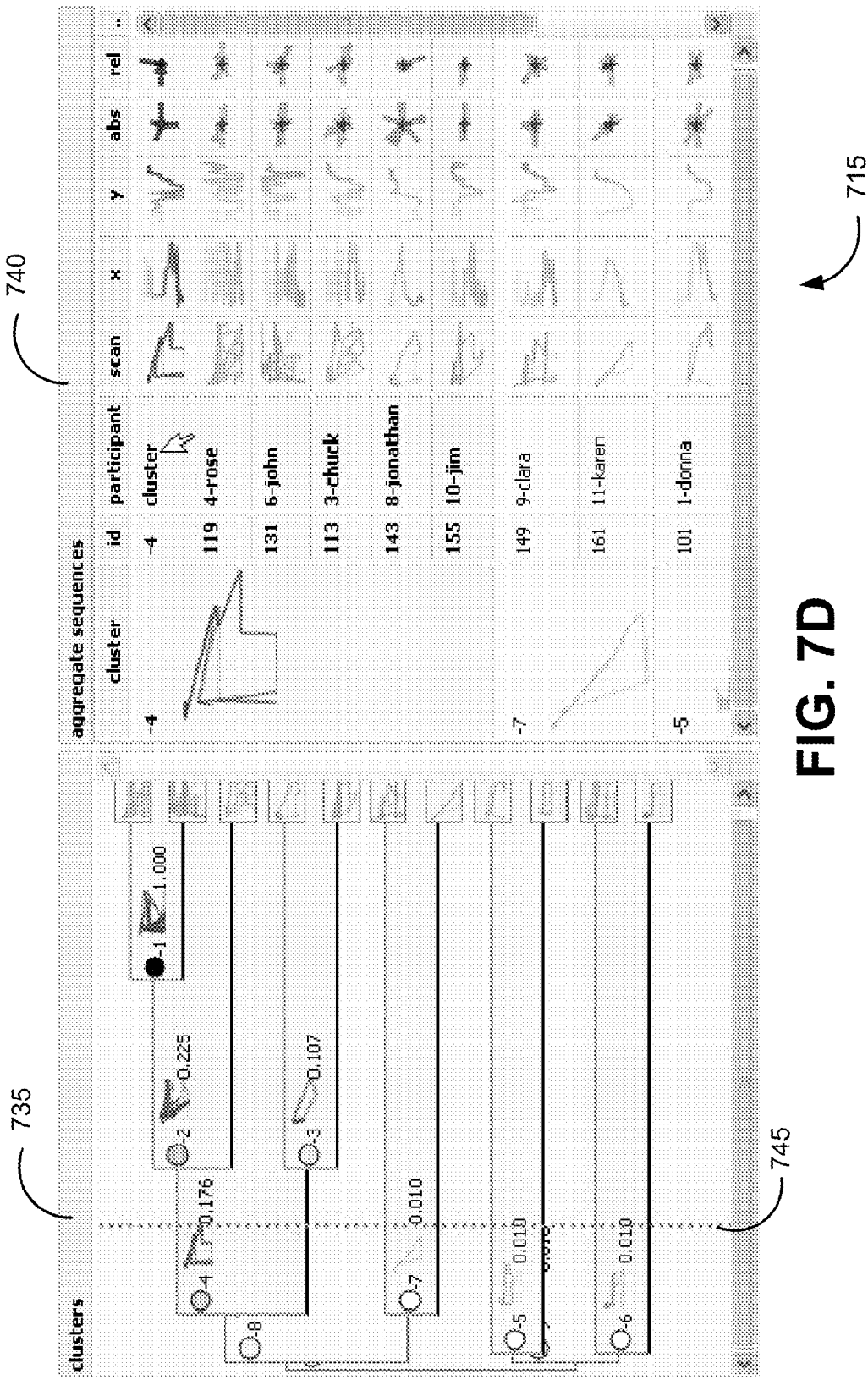

FIG. 7C-7D are a series of partial screenshots illustrating details of the results panel 715 and the interactive nature of the dendrogram 735 as the slider control 745 is moved. More specifically and as can be seen in detail here, the results panel 715 includes the interactive dendrogram 735 and slider control 745. As shown here, the dendrogram 735 includes a graphical representation of the hierarchy of the clusters. The clusters are represented by a unique identifying value, e.g., a negative integer, for each cluster. Each cluster represented can also include a graphical representation of an aggregate or representative sequence or value for that cluster, illustrated here as a representative scanpath for each cluster of the dendrogram 735. Additionally or alternatively, the dendrogram 735 can include a graphical or other indication of the degree to which the data of the cluster match, such as illustrated here by shaded or colored circles for each cluster where the darkness of the shading represents the degree to which the data of the cluster match. Since the leafs of the dendrogram, represented at the far right of the dendrogram here, represent single sequences rather than clusters, the leaf may include only a representation of the actual sequence, e.g., a scanpath, and may omit, for example, the cluster identifier, the representative sequence, the representation of the degree of matching, etc. included with the cluster representations at each branch.

The results panel also includes a detail view 740 including graphical representations of the aggregate data making up the clusters currently selected by the slider control 745. The graphical representations of the detail view 740 can include a table representing details of the clusters at a particular depth level of the dendrogram 735 currently selected based on a position of the slider control 745. The table can include, for example a number of rows, wherein each row represents a cluster at the selected level of the dendrogram 735. The table can also include a number of columns including details for each cluster. For example, the table can include one or more columns listing the identifiers and/or names for the cluster as well as data in the cluster. The table can additionally or alternatively include a column including a graphical representation of the data, e.g., the scanpath, for the cluster (the aggregate or representative sequence) as well as the actual sequence/scanpath for the individual sequences. Additionally or alternatively, the table can include one or more columns illustrating a horizontally and/or vertically expanded representation of the data. For example, expanding the data can comprise expanding the data on a time basis in either the horizontal or vertical direction as described in U.S. patent application Ser. No. 12/615,763 filed on Nov. 10, 2009 by Helfman and entitled "Time Expansion for Displaying Path Information" the details of which are incorporated herein by reference for all purposes. The table can additionally or alternatively include one or more columns illustrating a radial histogram for each cluster and sequence in the cluster. Generally speaking, the radial histogram can include a number of segments wherein the angle between the segments represents the difference between the sequence and an absolute reference or another sequence and the length of the segment represents a weight assigned through a binning process. Such radial histograms can be generated, for example, as described in U.S. patent application Ser. No. 12/616,016 filed on Nov. 10, 2009 by Helfman and entitled "Radial Histograms for Depicting Path Information" the details of which are incorporated herein by reference for all purposes.

Figure 7E:
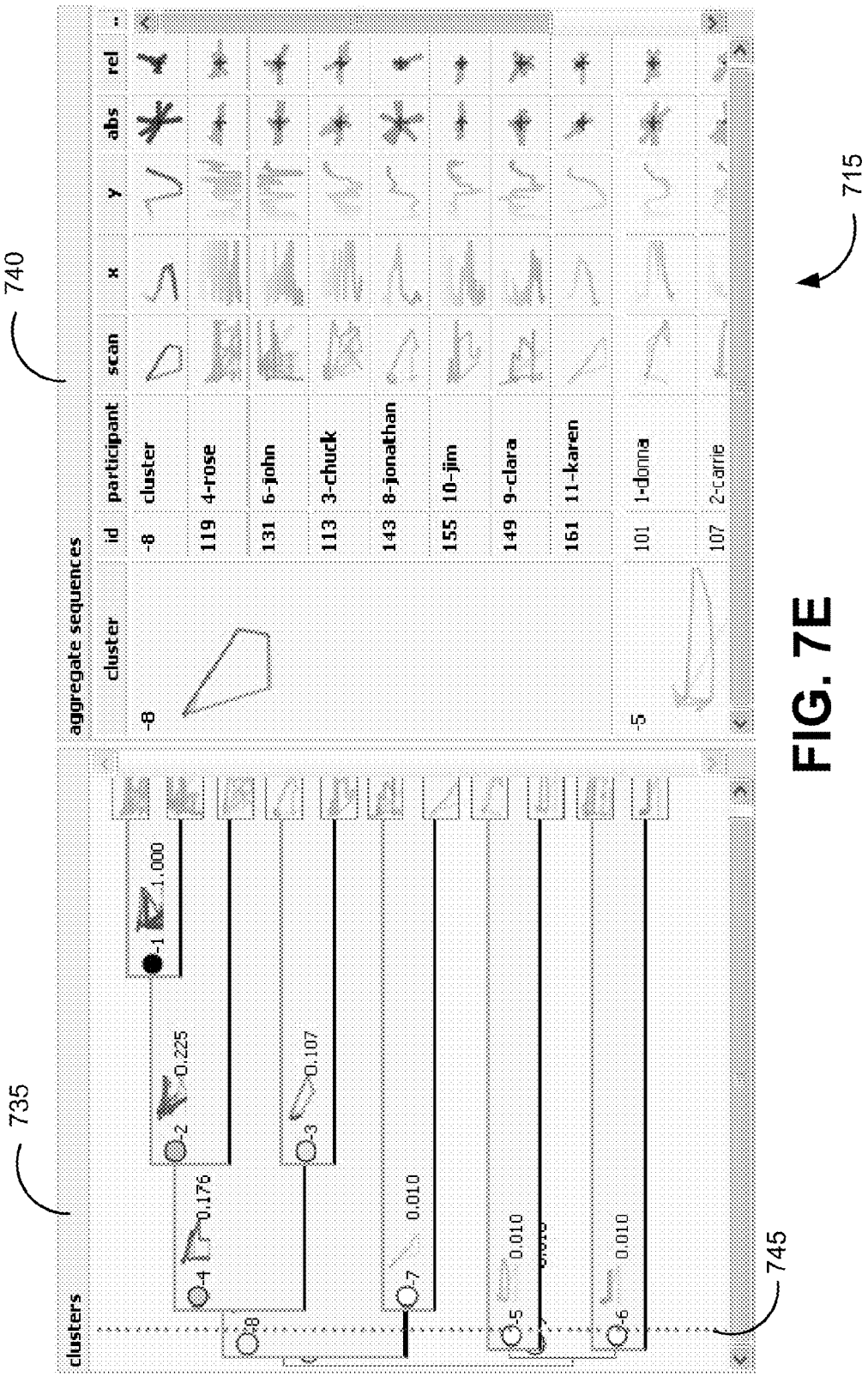

As can be seen by viewing FIGS. 7C-7E, the slider control 745 can be moved, for example by the user clicking and dragging the slider control 745 with a mouse or other pointing device, using arrow or other keys of a keyboard, or otherwise interacting with the interface. As the slider control 735 is moved to indicate a different depth level selection from the dendrogram 735, the table of the detail view 740 can be updated and/or re-displayed to show the details of the currently selected depth level of the dendrogram. The slider control 735 can be integrated with the dendrogram as a single interactive component in the form of a repositionable marker on the dendrogram to indicate the currently selected depth level of the dendrogram.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing an interactive representation of a data set of sequential data, the method comprising:

receiving, by a computer system, the data set comprising a plurality of ordered data sequences, wherein each data sequence corresponds to an ordered sequence of related data points;

clustering, by the computer system, the plurality of data sequences into a hierarchical set of clusters of the sequential data;

generating, by the computer system, a dendrogram structure based on the clustered sequential data, the dendrogram structure representing a hierarchy of the clustered sequential data;

presenting, by the computer system, the dendrogram structure within a page of a user interface, wherein the dendrogram structure comprises a graphical representation of an aggregate ordered sequence of the plurality of ordered data sequences, and wherein the user interface page includes a detail view illustrating detailed information for each cluster of the hierarchical set of clusters of the dendrogram structure, and wherein presenting the dendrogram structure within the page of the user interface further comprises, for the each cluster of the hierarchical set of clusters of the dendrogram structure:

(a) generating a graphical indication of a shaded circle corresponding to a degree to which involved pairs of the clusters match, wherein the degree to which the involved pairs of the clusters match is represented by a level of shading of the shaded circle, and (b) presenting the graphical indication of the shaded circle at a particular location within the dendrogram associated with the involved pairs of the clusters;

receiving, by the computer system, user input via a slider control of the user interface page, the user input selecting a depth for the dendrogram structure, wherein the slider control indicates a currently selected depth level of the dendrogram structure, the slider comprising a user repositionable marker to indicate the currently selected depth level of the dendrogram structure;

dynamically re-clustering, by the computer system, the plurality of ordered data sequences into a new hierarchical set of clusters of the sequential data, based on the received selection of the depth of the dendrogram structure via manipulation of the slider control;

re-generating, by the computer system, the dendrogram structure based on the reclustered sequential data; and updating, by the computer system, the user interface page with the re-generated dendrogram structure, wherein updating the user interface page includes updating the detail view illustrating the detailed information for each cluster of the re-clustered hierarchical set of clusters at the selected level of the dendrogram structure.

2. The method of claim 1, wherein receiving the selection of the depth of the dendrogram structure comprises receiving an indication of a movement of the slider control.

3. The method of claim 2, wherein the dendrogram structure comprises a graphical representation of the hierarchy of the hierarchical set of clusters.

4. The method of claim 3, wherein the dendrogram structure comprises a unique identifier for the each cluster of the hierarchical set of clusters.

5. The method of claim 1, wherein the user interface page comprises rows presenting details of the each cluster of the re-clustered hierarchical set of clusters at the selected level of the dendrogram structure as indicated by a current position of the slider control.

6. The method of claim 5, wherein the user interface page includes a table having one or more rows listing each ordered sequence in the re-clustered hierarchical set of clusters at the selected level of the dendrogram structure and one or more rows listing identifiers for the each ordered sequence of the re-clustered hierarchical set of clusters at the selected level of the dendrogram structure.

7. The method of claim 6, wherein the table includes a column including another graphical representation of an aggregate ordered sequence of the re-clustered hierarchical set of clusters at the selected level of the dendrogram structure and wherein related sequences of the each cluster at the selected level of the dendrogram structure are represented in two or more rows of the table corresponding to the another graphical representation of the aggregate ordered sequence of the each cluster.

8. The method of claim 7, wherein the table includes one or more columns illustrating a time expanded representation of the each ordered sequence of the re-clustered hierarchical set of clusters at the selected level of the dendrogram structure.

9. The method of claim 8, wherein the table includes one or more columns illustrating a radial histogram for the each cluster of the re-clustered hierarchical set of clusters at the selected level of the dendrogram structure and data in the each cluster of the re-clustered hierarchical set of clusters at the selected level of the dendrogram structure.

10. The method of claim 1, wherein presenting the dendrogram structure within the page of the user interface comprises:

for the each cluster of the hierarchical set of clusters of the dendrogram structure, generating and presenting another graphical representation of an aggregate representative sequence for the each cluster.

11. The method of claim 1, wherein updating the user interface page further includes, for the each cluster of the re-clustered hierarchical set of clusters of the re-generated dendrogram structure:

generating an updated graphical indication of the shaded circle corresponding to the degree to which involved pairs of the clusters match, wherein the degree to which the involved pairs of the clusters match is represented by an updated level of shading of the shaded circle, and presenting the updated graphical indication of the shaded circle at an updated location within the re-generated dendrogram associated with the involved pairs of the clusters.

12. A system comprising:

a processor; and a memory communicatively coupled with and readable by the processor, the memory having stored therein a series of instructions which, when executed by the processor, cause the processor to provide an interactive representation of data of a data set by:

receiving the data set comprising a plurality of ordered data sequences, wherein each data sequence corresponds to an ordered sequence of related data points;

clustering the plurality of data sequences into a hierarchical set of clusters of sequential data;

generating a dendrogram structure based on the clustered sequential data, the dendrogram structure representing a hierarchy of the clustered sequential data;

presenting the dendrogram structure within a page of a user interface, wherein the dendrogram structure comprises a graphical representation of an aggregate ordered sequence of the plurality of ordered data sequences, and wherein the user interface page includes a detail view illustrating detailed information for each cluster of the hierarchical set of clusters of the dendrogram structure, and wherein presenting the dendrogram structure within the page of the user interface further comprises, for the each cluster of the hierarchical set of clusters of the dendrogram structure:
(a) generating a graphical indication of a shaded circle corresponding to a degree to which involved pairs of the clusters match, wherein the degree to which the involved pairs of the clusters match is represented by a level of shading of the shaded circle, and
(b) presenting the graphical indication of the shaded circle at a particular location within the dendrogram associated with the involved pairs of the clusters;
receiving user input via a slider control of the user interface page, the user input selecting a depth for the dendrogram structure, wherein the slider control indicates a currently selected depth level of the dendrogram structure, the slider comprising a user repositionable marker to indicate the currently selected depth level of the dendrogram structure;
dynamically re-clustering the plurality of ordered data sequences into a new hierarchical set of clusters of the sequential data, based on the received selection of the depth of the dendrogram structure via manipulation of the slider control;
re-generating the dendrogram structure based on the reclustered sequential data; and
updating the user interface page with the re-generated dendrogram structure, wherein updating the user interface page includes updating the detail view illustrating the detailed information for each cluster of the re-clustered hierarchical set of clusters at the selected level of the dendrogram structure.

13. The system of claim 12, wherein receiving the selection of the depth of the dendrogram structure comprises receiving an indication of a movement of the slider control.

14. The system of claim 13, wherein the dendrogram structure comprises a graphical representation of the hierarchy of the hierarchical set of clusters.

15. The system of claim 14, wherein the dendrogram structure comprises a unique identifier for the each cluster of the hierarchical set of clusters.

16. The system of claim 12, wherein the user interface page comprises rows presenting details of the each cluster of the re-clustered hierarchical set of clusters at the selected level of the dendrogram structure as indicated by a current position of the slider control.

17. The system of claim 16, wherein the user interface page includes a table having one or more rows listing each ordered sequence in the re-clustered hierarchical set of clusters at the selected level of the dendrogram structure and one or more rows listing identifiers for the each ordered sequence of the re-clustered hierarchical set of clusters at the selected level of the dendrogram structure.

18. The system of claim 17, wherein the table includes a column including another graphical representation of an aggregate ordered sequence of the re-clustered hierarchical set of clusters at the selected level of the dendrogram structure and wherein related sequences of the each cluster at the selected level of the dendrogram structure are represented in two or more rows of the table corresponding to the another graphical representation of the aggregate ordered sequence of the each cluster.

19. The system of claim 18, wherein the table includes one or more columns illustrating a time expanded representation of the each ordered sequence of the re-clustered hierarchical set of clusters at the selected level of the dendrogram structure.

20. The system of claim 19, wherein the table includes one or more columns illustrating a radial histogram for the each cluster of the re-clustered hierarchical set of clusters at the selected level of the dendrogram structure and data in the each cluster of the re-clustered hierarchical set of clusters at the selected level of the dendrogram structure.

21. The system of claim 12, wherein presenting the dendrogram structure within the page of the user interface comprises:
for the each cluster of the hierarchical set of clusters of the dendrogram structure, generating and presenting another graphical representation of an aggregate representative sequence for the each cluster.

22. The system of claim 12, wherein updating the user interface page further includes, for the each cluster of the re-clustered hierarchical set of clusters of the re-generated dendrogram structure:
generating an updated graphical indication of the shaded circle corresponding to the degree to which involved pairs of the clusters match, wherein the degree to which the involved pairs of the clusters match is represented by an updated level of shading of the shaded circle; and
presenting the updated graphical indication of the shaded circle at an updated location within the re-generated dendrogram associated with the involved pairs of the clusters.

23. A non-transitory computer-readable memory comprising a set of computer-executable instructions stored thereon which, when executed by a processor, cause the processor to:
receive a data set comprising a plurality of ordered data sequences, wherein each data sequence corresponds to an ordered sequence of related data points;
cluster the plurality of data sequences into a hierarchical set of clusters of sequential data;
generate a dendrogram structure based on the clustered sequential data, the dendrogram structure representing a hierarchy of the clustered sequential data;
present the dendrogram structure within a page of a user interface, wherein the dendrogram structure comprises a graphical representation of an aggregate ordered sequence of the plurality of ordered data sequences, and wherein the user interface page includes a detail view illustrating detailed information for each cluster of the hierarchical set of clusters of the dendrogram structure, and wherein presenting the dendrogram structure within the page of the user interface further comprises, for the each cluster of the hierarchical set of clusters of the dendrogram structure:
(a) generating a graphical indication of a shaded circle corresponding to a degree to which involved pairs of the clusters match, wherein the degree to which the involved pairs of the clusters match is represented by a level of shading of the shaded circle, and
(b) presenting the graphical indication of the shaded circle at a particular location within the dendrogram associated with the involved pairs of the clusters;
receive user input via a slider control of the user interface page, the user input selecting a depth for the dendrogram structure, wherein the slider control indicates a currently selected depth level of the dendrogram structure, the slider comprising a user repositionable marker to indicate the currently selected depth level of the dendrogram structure;
dynamically re-cluster the plurality of ordered data sequences into a new hierarchical set of clusters of the sequential data, based on the received selection of the depth of the dendrogram structure via manipulation of the slider control;

re-generate the dendrogram structure based on the reclustered sequential data; and update the user interface page with the re-generated dendrogram structure, wherein updating the user interface page includes updating the detail view illustrating the detailed information for each cluster of the re-clustered hierarchical set of clusters at the selected level of the dendrogram structure.

24. The computer-readable memory of claim 23, wherein updating the user interface page further includes, for the each cluster of the re-clustered hierarchical set of clusters of the re-generated dendrogram structure:

generating an updated graphical indication of the shaded circle corresponding to the degree to which involved pairs of the clusters match, wherein the degree to which the involved pairs of the clusters match is represented by an updated level of shading of the shaded circle; and presenting the updated graphical indication of the shaded circle at an updated location within the re-generated dendrogram associated with the involved pairs of the clusters.

* * * * *

UNITED STATES PATENT AND TRADEMARK OFFICE
CERTIFICATE OF CORRECTION

PATENT NO. : 10,013,641 B2  
APPLICATION NO. : 12/831623  
DATED : July 3, 2018  
INVENTOR(S) : Helfman et al.

Page 1 of 1

It is certified that error appears in the above-identified patent and that said Letters Patent is hereby corrected as shown below:

In the Specification

In Column 9, Line 18, after "FIG. 4" insert -- . --.

In Column 10, Line 59, after "clustered" insert -- . --.

Signed and Sealed this
Second Day of April, 2019

Andrei Iancu
*Director of the United States Patent and Trademark Office*